United States Patent
Bowling

(10) Patent No.: US 10,479,543 B1
(45) Date of Patent: Nov. 19, 2019

(54) CONTAINER FOR STORING, DISPENSING, AND SERVING LIQUIDS

(71) Applicant: Robert William Bowling, Knightstown, IN (US)

(72) Inventor: Robert William Bowling, Knightstown, IN (US)

(*) Notice: Subject to any disclaimer, the term of this patent is extended or adjusted under 35 U.S.C. 154(b) by 0 days.

(21) Appl. No.: 16/042,490

(22) Filed: Jul. 23, 2018

Related U.S. Application Data

(60) Provisional application No. 62/668,942, filed on May 9, 2018.

(51) Int. Cl.
*B65D 1/04* (2006.01)
*B65D 1/32* (2006.01)

(52) U.S. Cl.
CPC ...... *B65D 1/04* (2013.01); *B65D 1/32* (2013.01)

(58) Field of Classification Search
CPC .. B65D 1/04; B65D 1/32; B65D 2543/00055; B65D 51/18; A45F 3/16; A45F 3/18; A45F 3/20
See application file for complete search history.

(56) References Cited

U.S. PATENT DOCUMENTS

| | | | | |
|---|---|---|---|---|
| 2,024,741 A * | 12/1935 | Osterman | ............... | B65D 71/00 |
| | | | | 206/499 |
| 2,608,320 A * | 8/1952 | Harrison, Jr. | ...... | B65D 83/0055 |
| | | | | 222/107 |
| 2,855,120 A * | 10/1958 | Bramming | .......... | A47J 41/0083 |
| | | | | 215/12.1 |
| 3,017,047 A * | 1/1962 | Payson | ................. | A47J 41/024 |
| | | | | 215/12.1 |
| 3,319,837 A * | 5/1967 | Mueller | ................. | B65D 83/00 |
| | | | | 222/212 |
| 3,334,797 A * | 8/1967 | Latham | ................... | B65D 25/46 |
| | | | | 229/221 |
| 3,456,650 A * | 7/1969 | Schwartzman | .... | B65D 47/2075 |
| | | | | 215/260 |
| 3,506,162 A * | 4/1970 | Schwartzman | ....... | B05B 11/047 |
| | | | | 222/207 |
| 3,591,768 A * | 7/1971 | Torres | .................... | A45C 11/20 |
| | | | | 206/543 |
| 3,618,807 A * | 11/1971 | Rownd | ............... | A47J 41/0083 |
| | | | | 220/212 |
| 3,705,668 A * | 12/1972 | Schwartzman | .... | B65D 47/2075 |
| | | | | 222/207 |
| 4,150,761 A * | 4/1979 | Collins | ..................... | A45F 3/16 |
| | | | | 215/228 |
| 4,215,785 A * | 8/1980 | Schwaiger | ............. | A61J 9/003 |
| | | | | 215/11.6 |

(Continued)

Primary Examiner — Frederick C Nicolas
Assistant Examiner — Randall A Gruby

(57) ABSTRACT

A container for storing, dispensing, and serving liquids has a bottle a dispenser outlet an outlet cap, and a serving cup. The bottle has a shoulder that is laterally connected around a body of the bottle. The shoulder is positioned offset from a base of the bottle so that the base can be inserted into the serving cup while the bottle is being transported. The serving cup acts as a stand for the bottle as well as a serving dish for any fluid in the bottle. The dispenser outlet is integrated into a base of the bottle and enables the stored fluid to flow out of the bottle. Additionally, the outlet cap is detachably mounted over the dispenser outlet so that the user can prevent or allow the fluid to flow through the dispenser outlet.

2 Claims, 7 Drawing Sheets

(56) References Cited

U.S. PATENT DOCUMENTS

| | | | | |
|---|---|---|---|---|
| 4,230,230 A * | 10/1980 | Mumford | B65D 41/18 | 215/277 |
| 4,273,247 A * | 6/1981 | Earls | B65D 41/26 | 141/380 |
| 4,625,898 A * | 12/1986 | Hazard | B65D 47/0819 | 215/235 |
| 4,792,994 A * | 12/1988 | Aylward | H04B 1/08 | 206/542 |
| 4,834,251 A * | 5/1989 | Yu | B65D 41/06 | 215/222 |
| 4,903,848 A * | 2/1990 | Chattman | B65D 51/246 | 15/145 |
| 5,086,926 A * | 2/1992 | Paige | A47J 41/02 | 206/542 |
| 5,234,688 A * | 8/1993 | Gaffar | A61K 8/24 | 424/401 |
| 5,303,852 A * | 4/1994 | Yamawaki | B65D 83/0055 | 222/209 |
| 5,318,204 A * | 6/1994 | Davis | B65D 83/0055 | 222/105 |
| 5,332,121 A * | 7/1994 | Schmidt | B29C 45/1646 | 222/105 |
| 5,373,967 A * | 12/1994 | Grooms | B65D 83/0055 | 222/209 |
| 5,454,486 A * | 10/1995 | Mack | B05B 11/047 | 222/105 |
| 5,487,490 A * | 1/1996 | Estes | B65D 47/2031 | 222/1 |
| 5,497,906 A * | 3/1996 | Dubach | B65D 47/0838 | 215/241 |
| 5,499,738 A * | 3/1996 | Burleigh | B65D 1/04 | 215/395 |
| 5,667,107 A * | 9/1997 | Lindsey | B65D 23/003 | 222/173 |
| 5,865,353 A * | 2/1999 | Baudin | B65D 47/0814 | 215/235 |
| D410,175 S * | 5/1999 | Moran | D7/608 | |
| 6,042,850 A * | 3/2000 | Ida | A61J 9/001 | 215/11.1 |
| 6,126,024 A * | 10/2000 | Ramirez | A47G 19/2205 | 215/12.1 |
| 6,672,479 B2 * | 1/2004 | Shiraishi | B65D 23/02 | 222/105 |
| 6,705,492 B2 * | 3/2004 | Lowry | A47K 5/122 | 222/184 |
| D503,589 S * | 4/2005 | Schuler | D7/608 | |
| 7,500,585 B2 * | 3/2009 | Masuda | B65D 47/2075 | 137/614.2 |
| 8,333,289 B2 * | 12/2012 | Lopez | B65D 25/36 | 215/228 |
| 8,348,107 B2 * | 1/2013 | Succar | B65D 47/2018 | 222/209 |
| 8,434,645 B2 * | 5/2013 | Crawford | B05B 15/30 | 222/109 |
| 8,474,648 B1 * | 7/2013 | Ritzen | A47J 41/0088 | 220/212 |
| 8,740,023 B2 * | 6/2014 | Geiger | B65D 47/2025 | 222/213 |
| D757,279 S * | 5/2016 | Seidl | D24/197 | |
| 9,833,799 B2 * | 12/2017 | Minnette | B05B 11/047 | |
| 2001/0010314 A1 * | 8/2001 | Goto | A47J 41/0083 | 220/674 |
| 2004/0007555 A1 * | 1/2004 | Steele, IV | B65D 23/102 | 215/228 |
| 2004/0007601 A1 * | 1/2004 | Masuda | B65D 47/2075 | 222/494 |
| 2004/0050872 A1 * | 3/2004 | Masuda | B65D 35/14 | 222/212 |
| 2004/0262252 A1 * | 12/2004 | Hammer | B65D 41/26 | 215/228 |
| 2005/0211712 A1 * | 9/2005 | Moran | A47J 41/0011 | 220/592.17 |
| 2006/0016835 A1 * | 1/2006 | Perry | B65D 1/32 | 222/494 |

* cited by examiner

CONTAINER FOR STORING, DISPENSING, AND SERVING LIQUIDS

The current application claims a priority to the U.S. Provisional Patent application Ser. No. 62/668,942 filed on May 9, 2018.

FIELD OF THE INVENTION

The present invention relates generally to a food storage bottle. More specifically, the present invention relates to a food storage container that has an integrated serving spout and a detachable serving cup.

BACKGROUND OF THE INVENTION

Animal owners traveling with their pets do not have incentives to stop at convenience stores to grab drinks for their loved creatures. The reason is that most convenience stores do not carry liquid refreshments made for pets. For those that do, these stores do not usually place bottles of liquid refreshments in coolers. During hot weather, especially during the summertime, animal owners traveling with their pets would want to feed their loved creatures with liquid refreshment made for pets. However, finding a store selling cold liquid refreshments made for pets is a difficult task. There are two primary reasons why convenience stores do not carry liquid refreshments made for pets. First, animal liquid refreshment usually comes in bottles that do not fit into the slots of a commercial cooler. Second, traditional soft drink bottles are generally designed to feature small spouts and bottlecaps. Small caps have limited use as a feeder, or serving dish, due to their small volume. Hence, animal owners have to carry a separate feeder, and they have to transfer liquid refreshment from a bottle to the feeder. These separated feeders require either maintenance or additional cost. Additionally, these separate feeders have to be cleaned or disposed of after each use. If a pet owner wants to reuse the feeders, then they would have to find space in their vehicle to store these feeders. Bottles with a large lid have already existed in the market. However, these bottles have the following issue.

A cap of a bottle typically functions as a gate to prevent fluids stored within the bottle from spilling out. Additionally, the bottlecap prevents external microbes from entering the bottle. The present invention makes use of a large cap that can function as a serving dish. However, the use of the large cap as a serving dish can introduce unwanted contaminants into the fluid within the bottle. Therefore, a bottle having one cap allows microbial contamination to the cavity of the bottle.

An objective of the present invention is to solve the above problems. The preferred embodiment of the present invention is a bottle having two caps. A primary bottlecap and a secondary serving lid. The primary bottlecap is used to govern the flow of the stored fluid entering or exiting the bottle. The secondary serving lid is mounted over the bottlecap and functions as a receptacle into which the stored fluid can be poured. In addition to functioning as a serving dish, the secondary serving lid acts as a stand into which the bottle can be nested while not in use. This facilitated transporting the present invention and isolating the primary bottle cap from the external environment.

Additionally, the present invention can be produced in various shapes and sizes. To increase the aesthetics of the invention, one of the proposed shapes is a fire hydrant. Also, the present invention can be manufactured in various sizes including, but not limited to, 20-ounce bottles, 1-liter bottles, and 2-liter bottles. This enables the present invention to be used by animal owners who want to purchase large volume of animal liquid refreshments during a long road trip. Additionally, combinations of shape and size of the two-cap bottle increase the marketability.

DETAIL DESCRIPTIONS OF THE INVENTION

Figure 1:
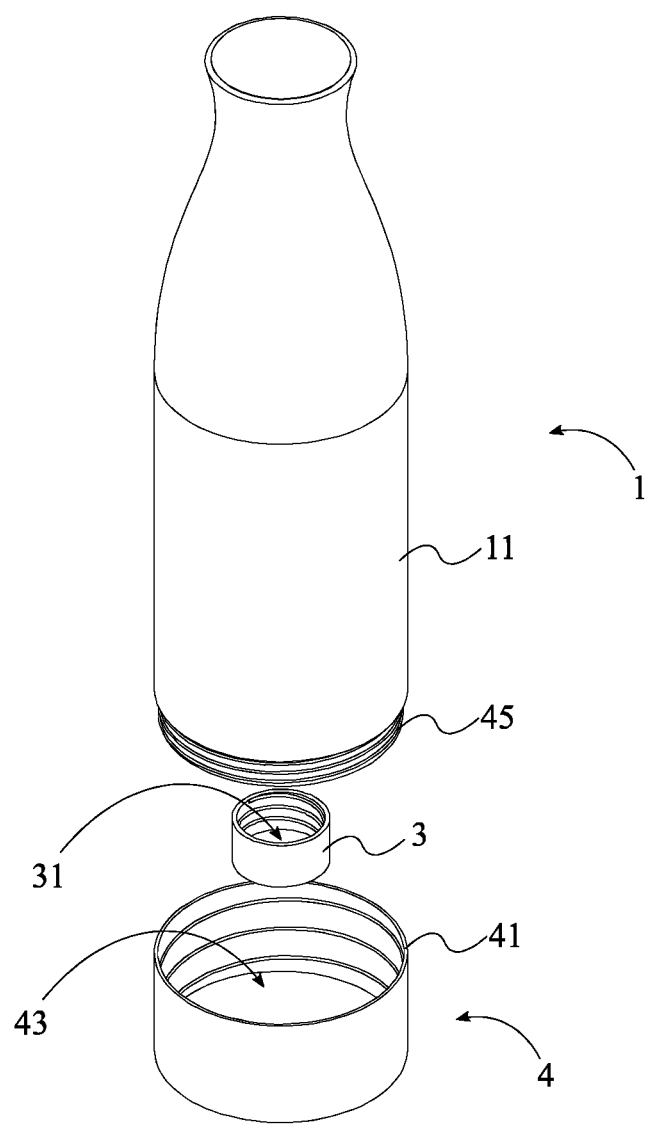
FIG. 1 is an exploded perspective view of the present invention.
Figure 2:
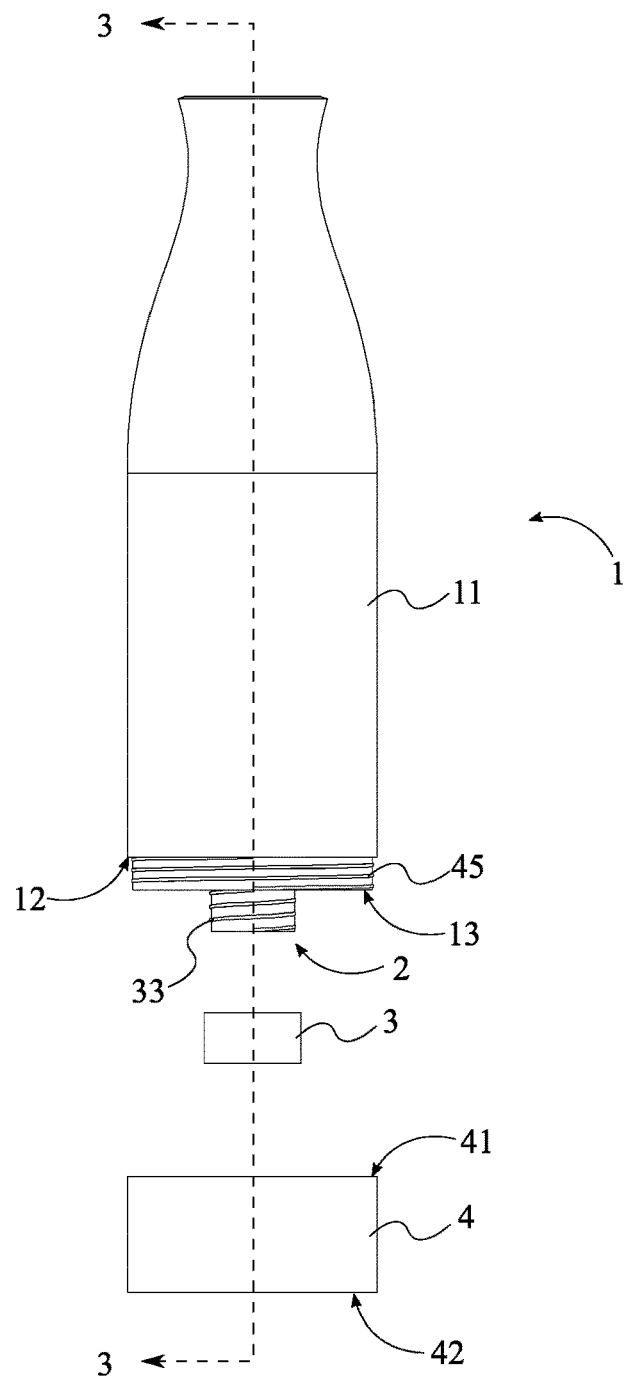
FIG. 2 is an exploded front view of the present invention.
Figure 3:
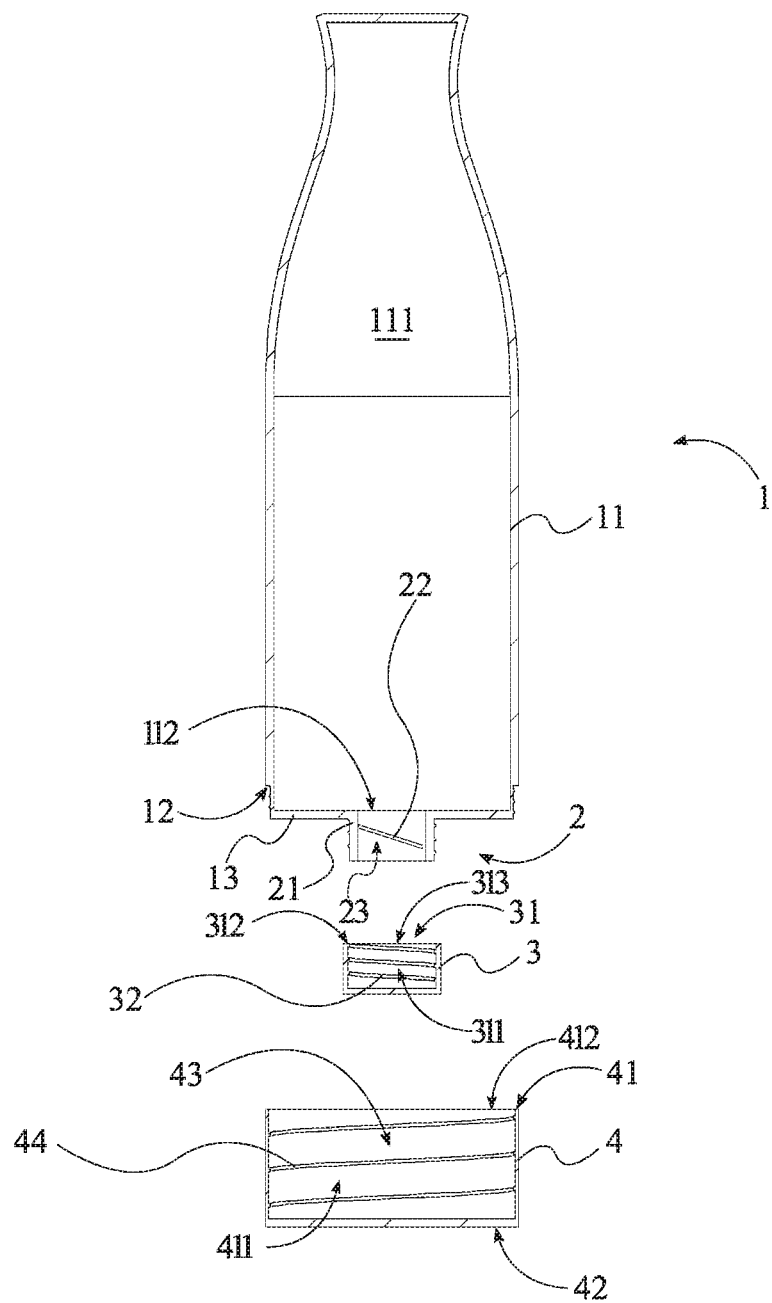
FIG. 3 is a left-side sectional view of the present invention taken along line 3-3 in FIG. 2.
Figure 4:
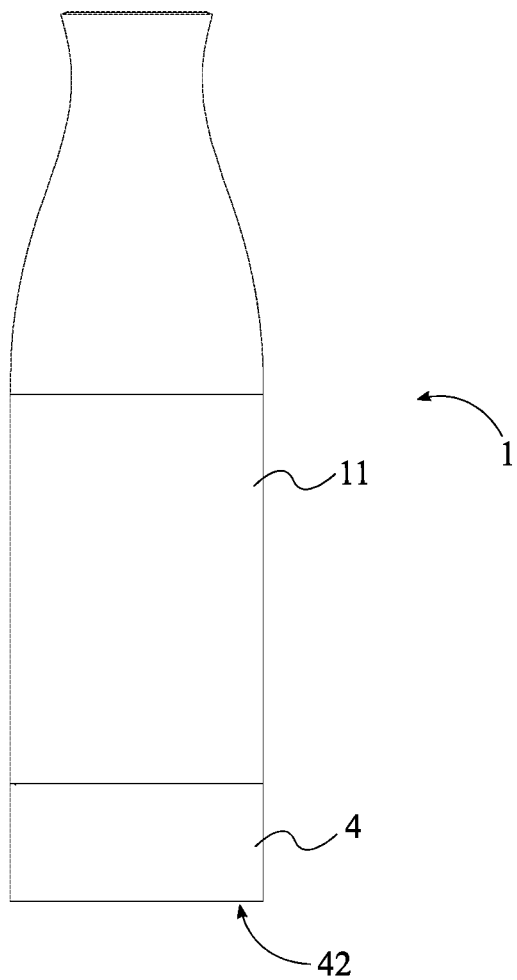
FIG. 4 is a front view of the present invention with the serving cup mounted onto the bottle.

All illustrations of the drawings are for the purpose of describing selected versions of the present invention and are not intended to limit the scope of the present invention.

In reference to FIG. 1 through FIG. 7, the present invention, the container for storing, dispensing and serving liquids, is a device that enables a user to transport and serve fluids without the use of an external serving bowl. To accomplish this, the present invention makes use of a container with a removable serving cup. The removable serving cup is designed to function as a serving bowl for the stored fluid. Preferably the present invention is used to transport and serve liquid animal food. To achieve the above-described functionalities, the present invention comprises a bottle 1, a dispenser outlet 2, an outlet cap 3, and a serving cup 4. The bottle 1 comprises a bottle body 11, an interior bottle compartment 111, a base 13, an external male base threading 45, a base opening 112 and a shoulder 12. Specifically, the bottle body 11 forms the structural foundation of the bottle 1 and denotes the present invention's overall shape. The interior bottle compartment 111 is formed within the bottle body 11. The base 13 is formed on a terminal portion of the bottle body 11. The base opening 112 is formed on the base 13. The base opening 112 is in fluid communication with the interior bottle compartment 111. The interior compartment 111 is used to store fluids. The external male base threading 45 is laterally mounted around the base 13. The shoulder 12 is laterally connected around the bottle body 11. Further, the shoulder 12 is positioned offset from the base 13, along the bottle body 11. Accordingly, the shoulder 12 forms an abutment that facilitates mounting the serving cup 4 onto the bottle body 11. Specifically, the shoulder 12 acts as a stop against which the serving cup 4 is pressed while mounted onto the bottle 1.

The present invention is designed to facilitate dispensing the entirety of the stored fluid. The dispenser outlet 2 comprises a dispensing outlet body 21 and a channel 23. To that end, the dispensing outlet body of the dispenser outlet 2 is integrated into the base 13 of the bottle 1. The channel 23 traverses through the dispensing outlet body 21. The channel 23 is in fluid communication with the base opening 112. Additionally, the channel 23 of the dispenser outlet 2 is in fluid communication with the interior compartment 111 of the bottle 1, through the base opening 112. As a result, the fluid stored within the interior compartment 111 is able to flow out of the bottle 1 without requiring the bottle 1 be upended. The outlet cap 3 is mounted onto the base 13. Additionally, the outlet cap 3 detachably seals the dispenser outlet 2. Accordingly, the outlet cap 3 is used to control the flow of fluid through the dispenser outlet 2. In the preferred embodiment of the present invention the outlet cap 3 is used to plug the dispenser outlet 2 when attached to the dispenser outlet 2. Conversely, the stored fluid is able to pass through the dispenser outlet 2 when the outlet cap 3 is removed. The outlet cap 3 comprises a cap body 31, an interior cap compartment 311, a cap rim 312 and a cap opening 313. The cap body 31 is detachably mounted onto the dispensing outlet body 21. The interior cap compartment 311 is formed within the cap body 31. The cap rim 312 is terminally formed on the cap body 31. The cap opening 313 is formed on the cap body 31. The cap opening 313 is in fluid communication with the interior cap compartment 311. The cap opening 313 is delineated by the cap rim 312. The serving cup 4 is perimetrically mounted onto the shoulder 12. The serving cup 4 comprises a cup body 43, an interior cup compartment 411, an upper cup rim 41, a flat bottom 42, a cup opening 412 and an internal female cup threading 44. The interior cup compartment 411 is formed within the cup body 43. The upper cup rim 41 is terminally formed on the cup body 43. The flat bottom 42 is terminally formed on the cup body 43. The upper cup rim 41 and the flat bottom 42 are oppositely located to each other. The cup opening 412 is formed on the cup body 43. The cup opening 412 is in fluid communication with the interior cup compartment 411. The cup opening 412 is delineated by the upper cup rim 41. The internal female cup threading 44 is laterally mounted around the cup body 43. The internal female cup threading 44 is configured to be engaged with the external male base threading 45. The upper cup rim 41 is configured to be pressed against the shoulder 12. Additionally, the outlet cap 3 is positioned within the cup body 43 of the serving cup 4. Thus, the serving cup 4 functions as a detachable receptacle that is attached to the base 13 of the bottle 1 and supports the bottle 1 when resting on a substantially flat surface. Additionally, because the base 13 of the bottle 1 nests within the serving cup 4 the present invention is able to function as a compact ergonomic device while being stored or transported.

The present invention is designed to enable the user to dispense the stored fluid in a controlled manner. The cap body 31 of the outlet cap 3 can be fitted over the dispensing outlet body 21 of the dispenser outlet 2. Specifically, the outlet cap 3 is detachably mounted over the dispensing outlet body 21 and the dispensing outlet body 21 is engaged into the cap body 31. Accordingly, the dispensing outlet body 21 is closed by the outlet cap 3 while the dispensing outlet body 21 is engaged into the cap body 31. In reference to FIG. 2 and FIG. 3, one embodiment of the present invention is designed to use a threaded connection to attach the outlet cap 3 to the dispensing outlet body 21. As such, the outlet cap 3 further comprises a female cap threading 32 and the bottle 1 further comprises a male cap threading 33. The male cap threading 33 is laterally mounted around the dispensing outlet body 21. Additionally, the female cap threading 32 is laterally mounted within the cap body 31. Further, the male cap threading 33 is engaged into the female cap threading 32. As a result, the outlet cap 3 can be selectively attached to the dispensing outlet body 21 by engaging the male cap threading 33 into the female cap threading 32. Conversely, the outlet cap 3 can be selectively detached from the dispensing outlet body 21 by disengaging the male cap threading 33 from the female cap threading 32.

Figure 5:
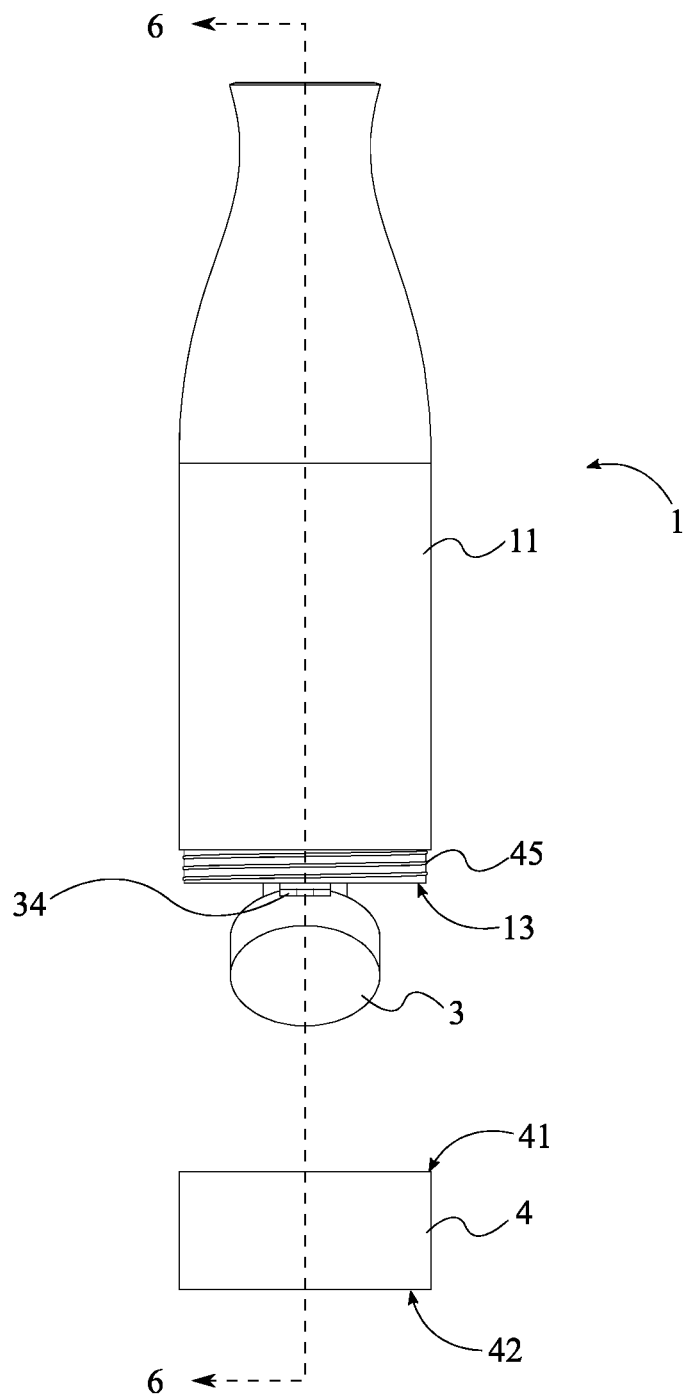
FIG. 5 is a front view of a first alternative embodiment of the present invention where the outlet cap is hingedly attached to the bottle.
Figure 6:
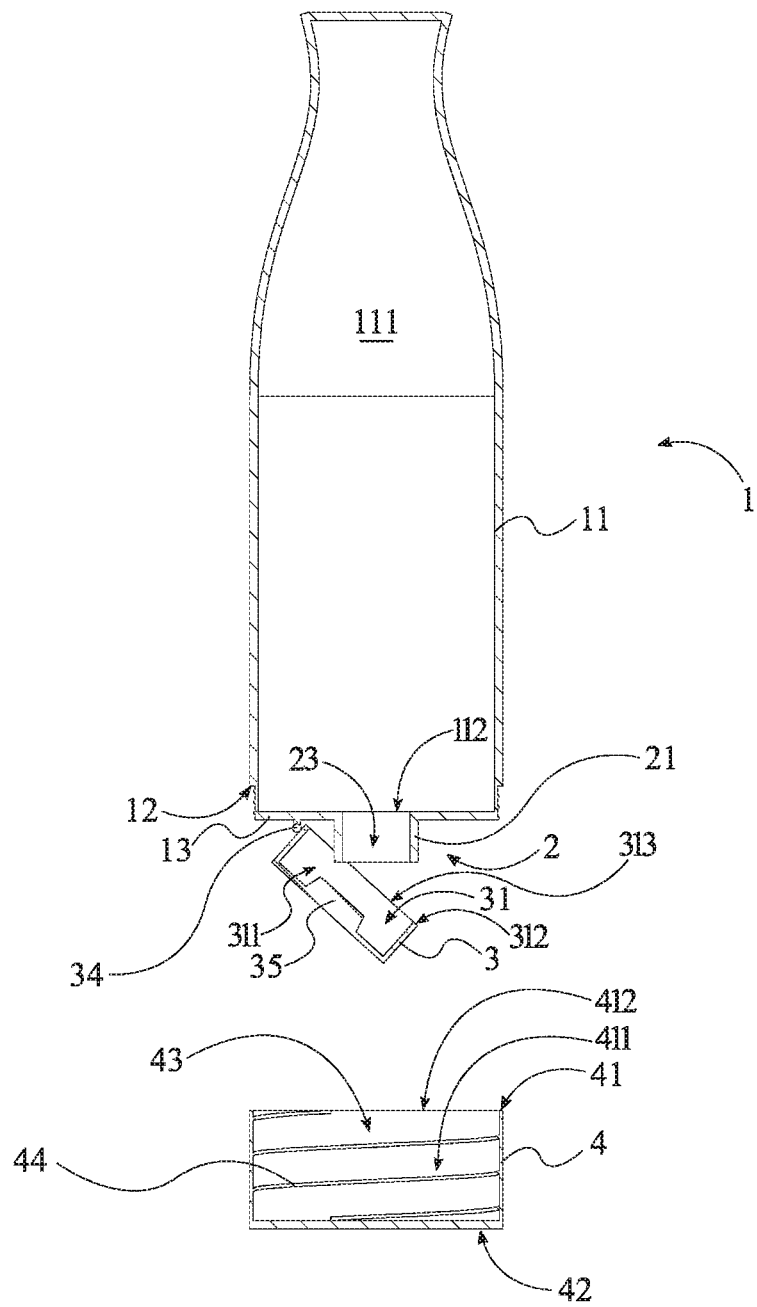
FIG. 6 is a left-side sectional view of the present invention taken along line 6-6 in FIG. 5.
Figure 7:
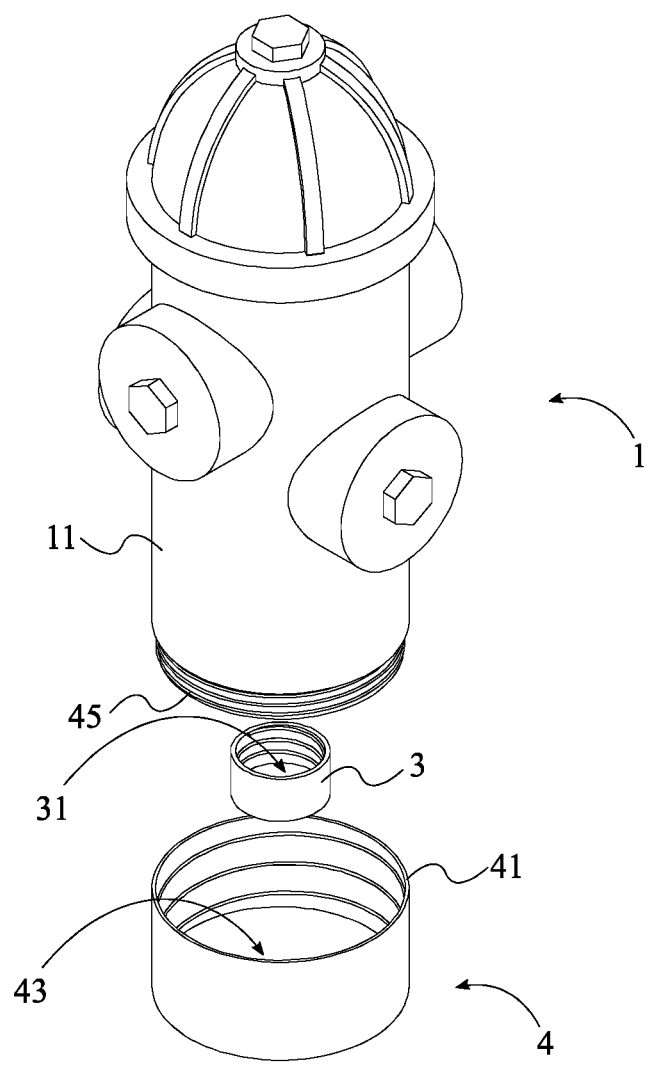
FIG. 7 is a perspective view of an embodiment of the present invention that is shaped similar to a fire hydrant.

In reference to FIG. 5 and FIG. 6, in a first alternative embodiment of the present invention, the outlet cap 3 is hingedly mounted onto the base 13 of the bottle 1. To facilitate this, the present invention comprises a hinge 34 and the outlet cap 3 comprises a stopper 35. The hinge 34 is connected in between the outlet cap 3 and the base 13 of the bottle 1. The hinge 34 is mounted onto the cap body 31 without any intervening structure. The hinge 34 is mounted onto the base 13 without any intervening structure. The hinge 34 is connected in between the cap body 31 and the base 13. Accordingly, the hinge 34 enables the user to disengage the outlet cap 3 and the dispensing outlet body 21 without disconnecting the outlet cap 3 from the base 13 of the bottle 1. In this alternative embodiment the stopper 35 is connected within the cap body 31. The stopper 35 is accommodated within the interior cap compartment 311. Additionally, the stopper 35 is configured to be inserted into the channel. Consequently, the stopper 35 is able to plug the channel while the dispensing outlet body 21 is engaged into the cap body 31. Thus, preventing the stored fluid from spilling out of the dispensing outlet body 21 accidentally. A second alternative embodiment of the present invention comprises a one-way valve 22. The one-way valve 22 is integrated into the dispenser outlet 2. Preferably the one-way valve 22 is a flap valve, and the bottle body 11 of the bottle 1 is constructed from flexible materials that can be squeezed. Additionally, the dispenser outlet 2 is in fluid communication with the interior compartment 111 through the one-way valve 22. In this embodiment, the flap valve 22 is biased closed. As a result, fluid is prevented from passing through the dispenser outlet 2 unless the user squeezes the bottle body 11 of the bottle 1.

The present invention is designed to use a serving cup 4 that acts as a receptacle for the base 13 of the bottle 1. Further, the serving cup 4 is designed to act as stand that enables the bottle 1 to be maintained in an upright orientation while resting on a substantially flat surface. To achieve this, the serving cup 4 further comprises the upper cup rim 41 and the flat bottom 42. The upper cup rim 41 is perimetrically positioned around the cup body 43 of the serving cup 4. Thus positioned, the upper cup rim 41 delineates the cup opening 412. Additionally, the upper cup rim 41 is positioned opposite to the flat bottom 42, across the serving cup 4. Accordingly, the flat bottom 42 facilitates maintaining the bottle 1 in an upright position while the base 13 of the bottle 1 is engaged through the upper cup rim 41 and into the cup body 43. While the base 13 is engaged into the cup body 43 the upper cup rim 41 is pressed against the shoulder 12. Additionally, the outlet cap 3 is positioned in between the base 13 and the flat bottom 42 so that the dispensing outlet body spout 21 and the outlet cap 3 are isolated from the external environment while the base 13 is engaged into the cup body 43.

In the preferred embodiment of the present invention the serving cup 4 is designed to be detachably mounted onto the bottle 1. To achieve this, the present invention further comprises the internal female cup threading 44 and the external male base threading 45. The external male base threading 45 is laterally mounted around the bottle body 11. Additionally, the internal female cup threading 44 is laterally mounted within the cup body 43. Further, the external male base threading 45 is engaged into the internal female cup threading 44. As a result, the serving cup 4 can be selectively attached to the bottle 1 by engaging the external male base threading 45 into the internal female cup threading 44. Conversely, the serving cup 4 can be selectively detached from the bottle 1 by disengaging the external male base threading 45 from the internal female cup threading 44.

Although the invention has been explained in relation to its preferred embodiment, it is to be understood that many other possible modifications and variations can be made without departing from the spirit and scope of the invention as hereinafter claimed.

What is claimed is:

1. A container for storing, dispensing, and serving liquids comprising:
    a bottle;
    a dispenser outlet;
    an outlet cap;
    a serving cup;
    a hinge;
    the dispenser outlet being integrated into the bottle;
    the outlet cap being detachably mounted onto the dispenser outlet;
    in response to the outlet cap being mounted onto the dispenser outlet, the dispenser outlet being accommodated within and covered by the outlet cap;
    the serving cup being detachably mounted onto the bottle;
    the serving cup being detachably mounted onto the bottle;
    in response to the serving cup being mounted onto the bottle, the dispenser outlet being accommodated within and covered by the serving cup;
    the hinge being connected in between the outlet cap and the bottle:
    the bottle comprising a bottle body, an interior bottle compartment, a base, an external male base threading, a base opening and a shoulder;
    the interior bottle compartment being formed within the bottle body;
    the base being formed on a terminal portion of the bottle body;
    the base opening being formed in the base;
    the base opening being in fluid communication with the interior bottle compartment;
    the external male base threading being laterally mounted around the base;
    the shoulder being laterally formed around the bottle body;
    the shoulder being adjacently located to the base;
    the dispenser outlet comprising a dispensing outlet body and a channel;
    the dispensing outlet body being integrated into the base;
    the channel traversing through the dispensing outlet body;
    the channel being in fluid communication with the base opening;
    the channel being in fluid communication with the base opening;
    the channel being in fluid communication with the interior bottle compartment via the base opening;
    the outlet cap comprising a cap body, an interior cap compartment, a cap rim, a cap opening and a stopper;
    the cap body being detachably mounted onto the dispensing outlet body;
    the interior cap compartment being formed within the cap body;
    the cap rim being terminally formed on the cap body;
    the cap opening being formed on the cap body;
    the cap opening being in fluid communication with the interior cap compartment;
    the cap opening being delineated by the cap rim;
    the stopper being connected with the cap body;
    the stopper being accommodated within the interior cap compartment;
    the stopper being configured to be inserted into the channel;
    in response to the cap body being mounted onto the dispensing outlet body, the stopper being inserted into the channel;
    the serving cup comprising a cup body, an interior cup compartment, an upper cup rim, a flat bottom, a cup opening and an internal female cup threading;
    the interior cup compartment being formed within the cup body;
    the upper cup rim being terminally formed on the cup body;
    the flat bottom being terminally formed on the cup body;
    the upper cup rim and the flat bottom being oppositely located to each other;
    the cup opening being formed on the cup body;
    the cup opening being in fluid communication with the interior cup compartment;
    the cup opening being delineated by the upper cup rim;
    the internal female cup threading being laterally mounted around the interior cup compartment;
    the internal female cup threading being configured to be engaged with the external male base threading;
    the upper cup rim being configured to be pressed against the shoulder;
    the hinge being mounted directly onto the cap body;
    the hinge being mounted directly onto the base; and
    the hinge being connected in between the cap body and the base and being located between the external male base threading and the cap.

2. The container for storing, dispensing, and serving liquids as claimed in claim 1 comprising:
    the dispenser outlet comprising a one-way valve;
    the one-way valve being connected with the dispensing outlet body; and
    the one-way valve being accommodated within the channel.

* * * * *